United States Patent Office 2,709,617
Patented May 31, 1955

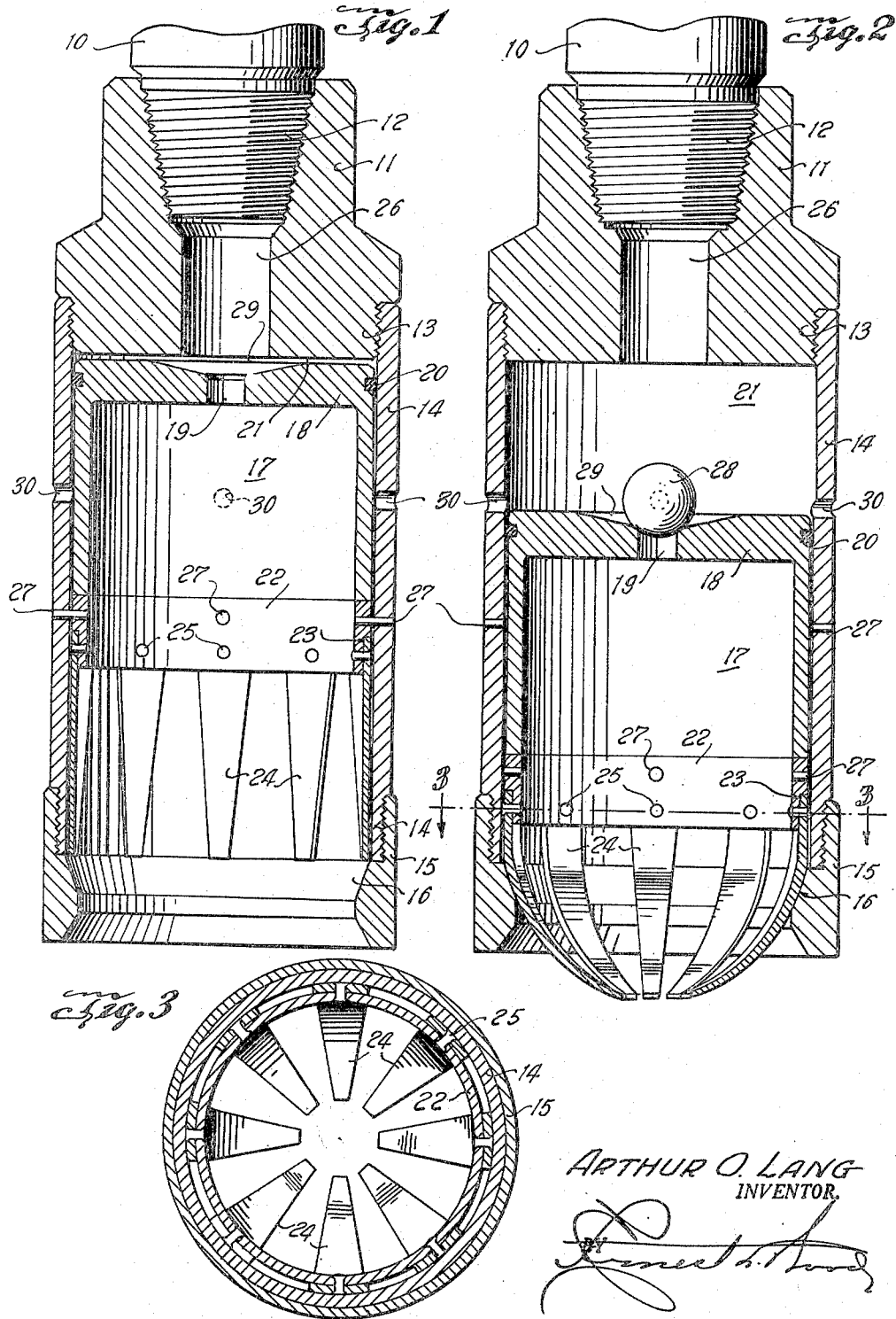

2,709,617

JUNK BASKET FOR WELLS

Arthur O. Lang, Abilene, Tex.

Application December 26, 1951, Serial No. 263,282

3 Claims. (Cl. 294—86)

This invention relates to well drilling equipment and more particularly to certain new and useful improvements in junk baskets for removing from the hole pieces of junk which would interfere with drilling operation.

Various types of junk baskets have been devised, among these being the basket bit, collapsible head fishing barrels and other types of fishing tools adapted for rotation in the hole and provided with collapsible prongs or pivoted teeth arranged to close upon the object which is to be removed from the hole. Among the objectionable features of these types of fishing tools is the fact that the exposed prongs or teeth are frequently bent, broken or otherwise impaired by their being brought into violent contact with hard formation or the fact that the object to be removed is displaced by the teeth or prongs out of the range of the tool thus making difficult an ordinarily simple operation.

It is the principal object of the present invention to provide a junk basket for wells which includes an element provided with circumferentially spaced prongs of malleable material and adapted to be collapsed into basket form to entrap a foreign object within a chamber of the tool but providing for the shielding of the prongs against contact with the formation until such time as the tool has been disposed above the foreign object or objects, whereupon the retriever, made up of the circumferentially spaced prongs, is projected from its place of concealment in the tool into receiving position in relation to the object and at the same time, the prongs are collapsed under the object to entrap the same.

Another object of the invention is to provide a junk basket in which the retriever is normally held in retracted position by shear pins which are also effective to hold in retracted position a piston through which fluid may be freely circulated but adapted to be closed against the passage of fluid by a ball dropped from the surface to cover a fluid aperture in the piston so that fluid pressure will be exerted on the head of the piston to effect downward displacement thereof and consequent projection of the retriever to receiving position.

Still another object of the invention is to provide a junk basket in which the cylindrical body thereof is provided with a removable lower flange having an internal annular prominence against which the prongs of the retriever are engaged under pressure of fluid imposed on the piston, thus to constrain the lower ends of the prongs to move collectively inward to engage under the object or objects to be removed from the hole.

With the foregoing objects in view, the invention has further reference to certain features of accomplishment which will become apparent as the description proceeds, taken in connection with the accompanying drawings wherein:

Figure 1 is a vertical sectional view of a junk basket constructed according to the invention showing the retriever and piston in retracted position.

Figure 2 is a similar view showing the retriever and piston in extended position, and Figure 3 is a view in transverse section taken on line 3—3 of Figure 2.

Continuing with a more detailed description of the drawing, reference numeral 10 denotes the lower section of a drill stem on which the invention is substituted for the conventional drilling bit during the fishing operation. The head 11 is provided with a threaded socket to receive the pin 12 of the drill stem 10 and has a threaded lower portion 13 which is received by the upper portion of a cylindrical body 14. The lower end of the body 14 is externally threaded and is received by a sleeve 15 whose inner surface is formed with a downwardly convergent bevel 16, to which further reference will be made presently.

Reciprocably mounted in the body 14 is a piston 17 having a head 18 provided with a central opening 19. The head 18 is annularly grooved to receive a packing ring 20 which frictionally engages the interior wall surface of the cylindrical body 14 and is effective to seal the space 21 between the head 11 and piston 17, which becomes a fluid pressure chamber during the period of actual operation of the tool.

Arranged in the cylindrical body 14 below the piston 17 is a ring 22. This ring, while actuated by the piston 17, is not connected thereto and forms a part of the retrieving unit. The ring 22 has an external annular recess 23 therein in which is disposed the upper ends of a plurality of circumferentially spaced prongs 24 of malleable material. The prongs are held in relative and substantially parallel position by means of rivets 25, or other means of securement and are tapered in the manner shown.

In operation, the tool is lowered into the hole by the drill pipe 10, during which fluid may be circulated downwardly through the drill pipe, through the axial passage 26 in the head 11 and through the opening 19 in the head of the piston 17. It is to be observed that during downward passage of the tool into the hole, the piston 17 and the retriever consisting of the ring 22 and prongs 24 are held in retracted position by sear pins 27 which extend through the walls of the cylindrical body 14 and the ring 22. When the tool has been positioned over the object to be removed from the hole, a ball 28 is dropped from the surface and passes through the drill pipe and passage 26 and, by virtue of a dish-shaped recess 29 in the top of the piston head 18, the ball assumes a position over the opening 19 in the head 18. The sudden interruption of passage of fluid through the opening 19 results in a building up of pressure above the piston 17 to such degree that the pins 27 will be sheared off whereupon the piston 17 will be suddenly projected downwardly, carrying with it the ring 22 and thereby forcing the prongs 28 against the beveled annular surface 16 of the lower sleeve 15. The result will be an inward convergence of the lower ends of the prongs 24 and these prongs will assume the basket like position shown in Figure 2 and will engage under the object or objects to be retrieved, entrapping them within the piston 17, which becomes a receiving chamber. The prongs 24 retain the positions to which they are urged by the forming flange or bevel 16 and in order to remove the objects after they have been brought to the surface, the sleeve 15 is unthreaded from the lower end of the barrel or cylindrical body 14 so that the ring 22 may be freely withdrawn from the body. It is also possible to move the ring and piston by detaching the cylindrical body 14 from the head 11.

After the piston 17 has been displaced under fluid pressure to project the prongs into receiving position as above described, fluid pressure in the chamber 21 is relieved by means of annularly spaced ports 30 in the walls of the cylindrical body 14. These ports are closed during retracted position of the piston 17 by the walls of the piston itself but are opened when the piston has been moved downwardly to expose the ports, as shown in Figure 2.

It is evident from the foregoing that the prongs 24 are not exposed to the formation until the tool has been oriented in relation to the objects to be removed from the hole, hence the likelihood of impairment of the prongs is remote.

Manifestly, the construction as shown and described is capable of some modification and such modification as may be construed to fall within the scope and meaning of the appended claims is also considered to be within the spirit and intent of the invention.

What is claimed is:

1. In a tool for retrieving junk objects from wells, the combination comprising a cylindrical body having a fluid passage in its upper portion, a plurality of circumferentially spaced and relatively parallel prongs of malleable material arranged for reciprocal movement in said cylindrical body, an annular mounting for said prongs, shear means holding said prong mounting to suspend said prongs collectively in elevated position to conceal the prongs wholly within the lower portion of said body, a piston freely mounted and reciprocable in said cylindrical body and disposed above and independently of said prong mounting and having a head provided with a central opening embraced by a dish-like cavity adapted to guide a ball dropped through said fluid passage into closing position over said central opening, said piston being adapted to be propelled by fluid entering through said fluid passage of said body to displace said shear means and exert a downward thrust on said mounting to cause said prongs to be projected from the lower end of said body, a sleeve at the lower end of said body having an inwardly tapered prominence formed on its internal surface against which said prongs engage to cause the same to be collapsed into basket form and means for relieving fluid pressure in said body above said prongs.

2. In a junk basket for wells, the combination comprising a cylindrical body and a removable head having an axial fluid passage therethrough, a piston whose outer diameter is substantially equal to the inner diameter of said body and reciprocable in said body below said head, the head of said piston being concaved and provided with a central opening, a ring of a diameter equal to that of said piston and reciprocable in said body below and independently of said piston, a plurality of circumferentially spaced prongs of malleable material having their upper ends affixed to said ring and extending downwardly therefrom in flush sliding engagement with the inner wall surface of said cylindrical body, an annular sleeve detachably connected to the lower end of said body and having a beveled prominence on its inner surface projecting inwardly of the walls of said body, shear means holding said piston in substantial juxtaposition with the undersurface of said head, a ball having a diameter less than that of said axial fluid passage but greater than that of said central opening and adapted to be dropped through said axial passage onto the concaved head of said piston to close the opening in the head of said piston, means for imposing fluid under pressure against the head of said piston through the axial fluid passage of said removable head to displace said piston and shear said shear means to propel said ring downwardly and project said prongs from said cylindrical body against said beveled prominence to collapse said prongs and means for releasing fluid from said cylindrical body above said piston in its displaced position.

3. In a tool for retrieving junk objects from wells, the combination comprising a cylindrical body having an axial fluid passage in its upper portion, a piston mounted for reciprocation in said body and having a dish-shaped head provided with a central opening, a ring in frictional engagement with the inner wall surface of said body and movable therein below said piston, a series of circumferentially spaced prongs of malleable material affixed at their upper ends to said ring and depending in said body in slidable engagement with the walls thereof, shearable means effective to hold said piston in retracted position therein, a ball receivable through said axial fluid passage and directed by said dish-shaped head to close the central opening in said piston head, means for introducing fluid under pressure through said axial fluid passage against said piston head to exert a pressure effective to shear said shearable means and cause downward displacement of said piston, said ring and said prongs, means for bending said prongs inwardly during their downward movement and means for relieving fluid pressure in said body above said piston.

References Cited in the file of this patent
UNITED STATES PATENTS

| | | |
|---|---|---|
| 2,266,739 | Cooper | Dec. 23, 1941 |
| 2,318,885 | Osmun | May 11, 1943 |
| 2,613,980 | Hawkins | Oct. 14, 1952 |

FOREIGN PATENTS

| | | |
|---|---|---|
| 570,842 | Great Britain | July 25, 1945 |